United States Patent
Lee et al.

(10) Patent No.: US 7,943,692 B2
(45) Date of Patent: *May 17, 2011

(54) POLYCARBONATE RESIN COMPOSITION AND MOLDED ARTICLES WITH THE SAME

(75) Inventors: Bong Jae Lee, Seoul (KR); Kyung Tae Kim, Seoul (KR); Sung Sig Min, Seoul (KR); Jong Cheol Lim, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 359 days.

This patent is subject to a terminal disclaimer.

(21) Appl. No.: 11/260,700

(22) Filed: Oct. 27, 2005

(65) Prior Publication Data

US 2006/0094820 A1 May 4, 2006

(30) Foreign Application Priority Data

Oct. 28, 2004 (KR) .................. 10-2004-0086648

(51) Int. Cl.
C08L 23/00 (2006.01)
C08L 51/00 (2006.01)
C08L 51/04 (2006.01)
C08L 67/00 (2006.01)
C08L 69/00 (2006.01)
C08L 77/12 (2006.01)

(52) U.S. Cl. ............. 524/490; 524/504; 525/67; 525/68

(58) Field of Classification Search .................. 525/67, 525/68; 524/490, 504

See application file for complete search history.

(56) References Cited

U.S. PATENT DOCUMENTS

| | | | |
|---|---|---|---|
| 4,148,842 A | | 4/1979 | Yu et al. |
| 4,372,835 A | * | 2/1983 | Chung et al. .................. 428/412 |
| 4,384,026 A | * | 5/1983 | Moore et al. .................. 428/412 |
| 4,481,330 A | | 11/1984 | Ohara et al. |
| 4,677,162 A | | 6/1987 | Grigo et al. |
| 4,945,130 A | | 7/1990 | Genz et al. |
| 5,242,981 A | | 9/1993 | Izumi et al. |
| 5,346,320 A | * | 9/1994 | Nguyen .................. 400/354 |
| 5,416,148 A | * | 5/1995 | Farah et al. .................. 524/409 |
| 5,424,361 A | | 6/1995 | De Rudder |
| 5,543,448 A | * | 8/1996 | Laughner .................. 524/109 |
| 5,830,940 A | * | 11/1998 | Nakamura et al. .................. 524/404 |
| 5,859,146 A | | 1/1999 | Kielhorn-Bayer et al. |
| 7,271,212 B2 | * | 9/2007 | Oguni et al. .................. 524/442 |
| 2002/0183425 A1 | | 12/2002 | Romer et al. |
| 2006/0094820 A1 | | 5/2006 | Lee et al. |
| 2007/0010620 A1 | * | 1/2007 | Seo et al. .................. 525/67 |

FOREIGN PATENT DOCUMENTS

| | | |
|---|---|---|
| EP | 265791 A2 | 4/1988 |
| JP | 58-59258 A | 4/1983 |
| JP | 03-281561 A | 12/1991 |
| JP | 09031309 | 2/1997 |
| JP | 10-279771 | 10/1998 |
| JP | 2000-129111 A | 5/2000 |
| KR | 1993-0004941 | 6/1993 |
| KR | 10-2001-0019451 A | 3/2001 |
| KR | 2001-0038924 A | 5/2001 |
| WO | WO 2005/061621 * | 7/2005 |

OTHER PUBLICATIONS

Hiemenz, Polymer Chemistry, (Marcel Dkker, 1984), pp. 34-43, QD 381.H52.*
Office Action in commonly owned U.S. Appl. No. 11/474,031, mailed Oct. 6, 2008.
International Search Report in counterpart International Application No. PCT/KR2005/003567, mailed Jan. 31, 2006.
International Search Report in commonly owned International Application No. PCT/KR2004/003264, mailed Mar. 24, 2005.

* cited by examiner

Primary Examiner — Jeffrey C Mullis
(74) Attorney, Agent, or Firm — Summa, Additon & Ashe, P.A.

(57) ABSTRACT

A polycarbonate composition and its use as a molded article and as housing or a part of electronic device are disclosed. The polycarbonate composition includes a polycarbonate resin, a liquid crystalline polymer resin, a core-shell grafted copolymer and a low molecular weight polyolefin. The composition has an impact strength of at least about 68 kg·cm/cm when a specimen of the composition is subject to a chemical treatment and the chemically treated specimen is tested according to the standard ASTM D256 (⅛" notched). The composition has an impact resistance of exhibiting substantially no cracking when a specimen of the composition is subject to a chemical treatment and the chemically treated specimen is tested at 0.6 m according to the standard ASTM D3029. The chemical treatment includes submerging the specimen in paint thinner for 20 seconds and thereafter drying the specimen at 70° C. for 5 minutes. Further, the composition has a fatigue resistance of at least about 130,000 when a specimen of the composition is tested at 4000 psi at 5 times per second according to the standard ASTM D638.

39 Claims, No Drawings

POLYCARBONATE RESIN COMPOSITION AND MOLDED ARTICLES WITH THE SAME

BACKGROUND OF THE INVENTION

1. Field of the Invention

The invention relates to a polycarbonate resin composition, molded articles at least partially made of the polycarbonate resin composition and electronic devices comprising at least one molded part made of the polycarbonate resin composition, and methods of making the same.

2. Discussion of Related Technology

Polycarbonate resins have been widely used as an engineering plastic material. Particularly, the polycarbonate resins are extensively used in housings and other parts of portable electronic devices including mobile phones. Certain physical or mechanical properties of these polycarbonate-based articles may deteriorate as these articles contact certain chemical compounds in their manufacturing or use. For example, many polycarbonate-based articles show significant reduction in their impact resistance and/or fatigue resistance when the articles contact organic solvents. This is a common problem for coating or painting the articles prior to, during or after the manufacturing of the polycarbonate-based articles.

It is well known in the art that other polymers, when mixed with a polycarbonate resin, may provide enhanced chemical resistance and impact resistance. However, the combination of other polymers with a polycarbonate resin often results in weld strength deterioration, decreased heat resistance, delamination, and loss of aesthetic appeal. In addition, large amounts of other polymers are often needed to affect any positive change in impact resistance or chemical resistance of polycarbonate resins. Polycarbonates also have poor compatibility with some polymer mixtures. Accordingly, there is a need to develop polycarbonate resin compositions having improved chemical resistance and/or fatigue strength while maintaining the composition's impact resistance and outward physical appearance when exposed to environmental stress such as chemicals.

SUMMARY OF CERTAIN INVENTIVE ASPECTS

One aspect of the invention provides a polycarbonate composition. The composition comprises: 80 to 98 parts by weight of a polycarbonate resin, 0.3 to 10 parts by weight of a liquid crystalline polymer resin, 0.5 to 10 parts by weight of a core-shell grafted copolymer, and 0.1 to 4 parts by weight of a polyolefin having a number average molecular weight of from about 1,000 g/mol to about 20,000 g/mol.

The foregoing composition may have an impact strength of at least about 68 kg·cm/cm when a specimen of the composition is subject to a chemical treatment and the chemically treated specimen is tested according to the standard ASTM D256 (⅛" notched) at 23° C., and wherein the chemical treatment comprises submerging the specimen in paint thinner for 20 seconds and thereafter drying the specimen at 70° C. for 5 minutes. The composition may have an impact resistance of exhibiting substantially no cracking when a specimen of the composition is subject to a chemical treatment and the chemically treated specimen is tested at 0.6 m according to the standard ASTM D3029, wherein the specimen is prepared according to the standard ASTM D256 with a hemispheric notch having a radius of 0.25±0.05 mm, and wherein the chemical treatment comprises submerging the specimen in paint thinner for 20 seconds and thereafter drying the specimen at 70° C. for 5 minutes. The composition may have a fatigue resistance of at least about 130,000 when a specimen of the composition is tested at 4000 psi at 5 times per second according to the standard ASTM D638.

Another aspect of the invention provides a molded article comprised the foregoing composition. The molded article may comprise a pellet of the composition or a structure for use as a body or housing of an electronic device.

Another aspect of the invention provides a polycarbonate composition. The composition comprises: a polycarbonate resin, a liquid crystalline polymer resin, a core-shell grafted copolymer, a low molecular weight polyolefin.

The foregoing composition may have an impact strength of at least about 68 kg·cm/cm when a specimen of the composition is subject to a chemical treatment and the chemically treated specimen is tested according to the standard ASTM D256 (⅛" notched) at 23° C., and wherein the chemical treatment comprises submerging the specimen in paint thinner for 20 seconds and thereafter drying the specimen at 70° C. for 5 minutes. The foregoing composition may have an impact strength of at least 70 kg·cm/cm when the chemically treated specimen is tested according to the standard ASTM D256 (⅛" notched). The composition may be in the form of a molded article. The molded article comprises a surface, and wherein the surface is coated with a coating layer may comprise an oil-based coating material.

The foregoing composition may have an impact resistance of exhibiting substantially no cracking when a specimen of the composition is subject to a chemical treatment and the chemically treated specimen is tested at 0.6 m according to the standard ASTM D3029, wherein the specimen is prepared according to the standard ASTM D256 with a hemispheric notch having a radius of 0.25±0.05 mm, and wherein the chemical treatment comprises submerging the specimen in paint thinner for 20 seconds and thereafter drying the specimen at 70° C. for 5 minutes. The foregoing composition may have an impact resistance of exhibiting substantially no cracking when the chemically treated specimen is tested at 0.8 m according to the standard ASTM D3029. The composition may have an impact resistance of exhibiting substantially no cracking when the chemically treated specimen is tested at 1 m according to the standard ASTM D3029. The composition may be in the form of a molded article. The molded article may comprise a surface, and wherein the surface is coated with a coating layer comprising an oil-based coating material.

The foregoing composition may have a fatigue resistance of at least about 130,000 when a specimen of the molded article is tested at 4000 psi at 5 times per second according to the standard ASTM D638. The composition may have a fatigue resistance of at least about 130,000 when the specimen is subject to a chemical treatment and the chemically treated specimen is tested at 4000 psi at 5 times per second according to the standard ASTM D638, and wherein the chemical treatment comprises submerging the specimen in paint thinner for 20 seconds and thereafter drying the specimen at 70° C. for 5 minutes. The composition may have a fatigue resistance of at least about 150,000 when the specimen is subject to a chemical treatment and the chemically treated specimen is tested at 4000 psi at 5 times per second according to the standard ASTM D638. The composition may have a fatigue resistance of at least about 170,000 when the specimen is tested at 4000 psi at 5 times per second according to the standard ASTM D638 without a chemical treatment prior to testing. The composition may be in the form of a molded article. The molded article comprises a surface, and wherein the surface may be coated with a coating layer may comprise an oil-based coating material.

Another aspect of the invention provides a method of making an electronic device. The method comprises: providing the foregoing molded article coated with the coating layer, providing at least one electrical part of an electronic device and connecting the molded article with the at least one electrical part. Still another aspect of the invention provides an electronic device produced by the foregoing method.

A further aspect of the invention provides an electronic device. The device comprise: a molded article comprising a polycarbonate resin, a liquid crystalline polymer resin, a core-shell grafted copolymer and a low molecular weight polyolefin. The molded article of the electronic device further comprises a surface; a coating layer formed on the surface of the molded article, the coating layer comprising a residual amount of an organic solvent. The molded article coated with the coating layer may have an impact strength of at least about 68 kg·cm/cm when a specimen of the composition is tested according to the standard ASTM D256 (⅛" notched). The molded article may have an impact resistance of exhibiting substantially no cracking when a specimen of the molded article is tested at 0.6 m according to the standard ASTM D3029, wherein the specimen is prepared according to the standard ASTM D256 with a hemispheric notch having a radius of 0.25±0.05 mm. Further the molded article may have a fatigue resistance of at least about 130,000 when a specimen of the molded article is tested at 4000 psi at 5 times per second according to the standard ASTM D638.

DETAILED DESCRIPTION OF EMBODIMENTS

As noted above, one aspect of the invention provides a polycarbonate composition. According to various embodiments of the invention, the polycarbonate composition comprises a polycarbonate resin, a liquid crystalline polymer resin, a core-shell grafted copolymer and a low molecular weight polyolefin. The polycarbonate compositions of the embodiments of the invention show enhanced physical or mechanical properties as compared to other polycarbonate compositions less one or more components. Also, the polycarbonate compositions of the embodiments of the invention show enhanced chemical resistance as compared to other polycarbonate compositions less one or more components.

As will be discussed, the polycarbonate compositions according to embodiments of the invention have good impact resistance, impact strength, fatigue strength, flame retardance and chemical resistance. Also, the polycarbonate compositions of embodiments of the invention are resistant to discoloration upon exposure to organic solvents.

In one embodiment, the polycarbonate composition, which comprises a polycarbonate resin, a liquid crystalline polymer resin, a core-shell grafted copolymer and a low molecular weight polyolefin, has an enhanced impact strength of at least about 68 kg·cm/cm when the composition is chemically treated and thereafter tested according to the standard ASTM D256 (⅛" notched). In another embodiment, the polycarbonate composition after a chemical treatment has an enhanced impact strength of at least about 70 kg·cm/cm. The chemical treatment comprises submerging a specimen of the composition in paint thinner for 20 seconds and thereafter drying the specimen at 70° C. for 5 minutes.

In one embodiment, the polycarbonate composition, which comprises a polycarbonate resin, a liquid crystalline polymer resin, a core-shell grafted copolymer and a low molecular weight polyolefin, exhibits substantially no cracking when the composition is chemically treated and thereafter tested at 0.6 m according to the standard ASTM D3029. In another embodiment, the polycarbonate composition exhibits substantially no cracking when the composition is chemically treated and thereafter tested at 0.8 m according to the standard ASTM D3029. In another embodiment, the polycarbonate composition exhibits substantially no cracking when the composition is chemically treated and thereafter tested at 1 m according to the standard ASTM D3029. In the foregoing embodiment with the enhanced impact resistance, the specimen is prepared according to the standard ASTM D256 with a hemispheric notch having a radius of 0.25±0.05 mm. The chemical treatment comprises submerging a specimen of the composition in paint thinner for 20 seconds and thereafter drying the specimen at 70° C. for 5 minutes.

In one embodiment, the polycarbonate composition, which comprises a polycarbonate resin, a liquid crystalline polymer resin, a core-shell grafted copolymer and a low molecular weight polyolefin, has an enhanced fatigue resistance of at least about 130,000 when a specimen of the composition is tested at 4000 psi at 5 times per second according to the standard ASTM D638. In another embodiment, the composition has an enhanced fatigue resistance of at least about 150,000 when tested under the same conditions. In another embodiment, the composition has an enhanced fatigue resistance of at least about 170,000 when tested under the same conditions.

In embodiments, the polycarbonate composition comprises about 60 to about 99.5 parts by weight of a polycarbonate resin, which includes, for example, 60, 61, 62, 63, 64, 65, 66, 67, 68, 69, 70, 71, 72, 73, 74, 75, 76, 78, 79, 80, 81, 82, 83, 84, 85, 86, 87, 88, 89, 90, 91 92, 93, 94, 95, 96, 97, 97, 99 or 99.5 parts by weight. In certain embodiments, the polycarbonate composition comprises an amount of a polycarbonate resin ranged between two of the foregoing values. In one embodiment, the polycarbonate composition comprises about 80 to about 98 parts by weight of a polycarbonate resin. Here, the unit "parts by weight" refers to a relative weight of each component given that the total weight of the polycarbonate resin, liquid crystalline polymer resin, core-shell grafted copolymer and low molecular weight polyolefin is 100 parts by weight.

In embodiments, the polycarbonate composition comprises about 0.1 to about 14 parts by weight of a liquid crystalline polymer resin, which includes, for example, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.1, 9.5, 10, 10.5, 11, 11.5, 12, 12.5, 13, 13.5 or 14 parts by weight. In certain embodiments, the polycarbonate composition comprises an amount of a liquid crystalline polymer resin ranged between two of the foregoing values. In one embodiment, the polycarbonate composition comprises about 0.3 to about 10 parts by weight of a liquid crystalline polymer resin.

In embodiments, the polycarbonate composition comprises about 0.2 to about 14 parts by weight of a core-shell grafted copolymer, which includes, for example, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.1, 9.5, 10, 10.5, 11, 11.5, 12, 12.5, 13, 13.5 or 14 parts by weight. In certain embodiments, the polycarbonate composition comprises an amount of a core-shell grafted copolymer ranged between two of the foregoing values. In one embodiment, the polycarbonate composition comprises about 0.5 to about 10 parts by weight of a core-shell grafted copolymer.

In embodiments, the polycarbonate composition comprises about 0.01 to about 7 parts by weight of a low molecular weight polyolefin, which includes 0.01, 0.03, 0.05, 0.07, 0.09, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5 or 7 parts by weight. In certain embodiments, the polycarbonate composition comprises an amount of a low molecular weight polyolefin ranged between two of the foregoing values. In one embodiment, the polycarbonate composition comprises about 0.1 to about 4 parts by weight of a low molecular weight polyolefin.

The polycarbonate composition according to embodiments of the invention may contain one or more compounds or polymers in addition to the foregoing components of a polycarbonate resin, a liquid crystalline polymer resin, a core-shell grafted copolymer and a low molecular weight polyolefin. Additional components or additives may be added to provide additional properties or characteristics to the polycarbonate composition or to modify existing properties of the composition. For example, an inorganic filler such as glass fiber, carbon fiber, talk, silica, mica, and alumina may be added to improve mechanical strength and heat distortion temperature of the resin composition. In addition, the polycarbonate composition may further include a heat stabilizer, an anti-oxidant, an ultraviolet absorbing agent, a light stabilizer, a flame retardant, a lubricant, a pigment and/or dye. One of ordinary skill in the art will appreciate that various additives may be added to the polycarbonate compositions according to embodiments of the invention.

In embodiments, the polycarbonate compositions are prepared by mixing their components including polycarbonate resin, a liquid crystalline polymer resin, a core-shell graft copolymer, and a low molecular weight polyolefin. In some embodiments, one or more other additives may be mixed together with the components of the polycarbonate composition. In some embodiments, one or more component resins may be heated to melt prior to the mixing or the composition may be heated during the mixing. The mixing may occur when each components is in a solid, liquid, or dissolved state, or mixtures thereof. In one embodiment, the above components are mixed together all at once. Alternatively, one or more components are added individually. For example, the polycarbonate resin may first be mixed with the liquid crystalline polymer resin, prior to mixing this admixture with the remaining components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

Another embodiment provides a molded article using a polycarbonate composition according to the foregoing embodiments. The polycarbonate compositions are molded into various shapes. For molding with the composition, an extrusion molding machine such as a vented extruder may be used. The polycarbonate resin composition of embodiments may be molded into various moldings using, for example, a melt-molding device. In embodiments, the polycarbonate composition is formed into a pellet, which then may be molded into various shapes using, for example, injection molding, injection compression molding, extrusion molding, blow molding, pressing, vacuum forming or foaming. In one embodiment, the polycarbonate composition can be made into a pellet using melt-kneading, and the resulting pellets are molded into moldings through injection molding or injection compression molding.

As noted, in one embodiment, the polycarbonate compositions are formed into pellets. In other embodiments, the polycarbonate compositions are formed into structural parts of various consumer products, including electronic devices and appliances. In some embodiments, the polycarbonate compositions are molded into a housing or body of electronic or non-electronic devices. Examples of electrical devices in which a molded article made of the polycarbonate composition according to embodiments of the invention include printers, computers, word processors, keyboards, personal digital assistants (PDA), telephones, mobile phones, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

In producing structural parts of various consumer products, the molded articles from the polycarbonate composition may be subject to various processing, which includes certain chemical treatments. In some embodiments, chemical treatments include coating, film forming, painting, welding, plating, etc. on a surface of the molded article. Typically these chemical treatments involve containing an organic solvent onto a surface of the molded article. The organic solvents to which some embodiments may be exposed include, for example, alcohols, aromatic hydrocarbons, aliphatic hydrocarbons, ethers, ketones, esters, mineral spirits, paint thinners, and so forth. Of these organic solvents, specific examples of the alcohols include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, diacetone alcohol, acetone, and so forth. Specific examples of the aromatic hydrocarbons include benzene, toluene, xylene and so forth, specific examples of the ethers include tetrahydrofuran, dioxane and so forth, specific examples of the ketones include acetone, methyl ethyl ketone, methyl isobutyl ketone, diisobutyl ketone and so forth, and specific examples of the esters include ethyl acetate, propyl acetate, butyl acetate, propylene carbonate and so forth. These organic solvents maybe used alone or as a mixture of two or more of them. Another solvent that may be used is Stoddard Solvent, otherwise known as paint thinner.

One aspect of the invention provides a molded article after a chemical treatment. The molded article with a chemical treatment may have a coating layer of a certain chemical compound on the surface of chemical treatment. In one embodiment, the coating layer may contain an oil-based coating material. In another embodiment, the coating layer may contain a dye compound. In another embodiment, the coating layer may contain a residual amount of an organic solvent, more particularly, paint thinner.

Another aspect of the invention provides an electronic device which includes housing or a part, which is made of a polycarbonate composition in accordance with an embodiment of the invention. In some embodiments, the housing or part of the electronic device may have a coating layer over a surface of the housing or part. In one embodiment, as discussed above, the coating layer comprises a residual amount of an organic solvent or an oil-base coating material.

Polycarbonate Resin

The polycarbonate resin used in embodiments of the invention includes a polycarbonate compound or a mixture of two or more polycarbonate compounds. The polycarbonate compounds include homopolymers or copolymers containing a repeating ester group. For example, the polycarbonate compounds include linear or branched or polycarbonate compounds, and further include polyester carbonate copolymers, silicone-polycarbonate copolymers, and other copolymers containing carbonate. The skilled artisan will appreciate additional examples of the polycarbonate compounds.

In one embodiment, the average molecular weight ($M_w$) of the polycarbonate resin is from about 10,000 to about 40,000. In another embodiment, the average molecular weight of the polycarbonate resin is from about 15,000 to about 35,000. More particularly, the average molecular weight of the polycarbonate resin is from about 20,000 to about 30,000.

Typically, a polycarbonate compound may be obtained from a reaction of one or more diphenols with a carbonate precursor or phosgene in the presence of a molecular weight controlling agent and usually in the presence of a catalyst. A reaction involving two diphenols may result in a copolymeric polycarbonate compound. Typical examples of the diphenol used include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called bisphenol A), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{((3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. Typically, the carbonate precursor is a carbonyl halide, carbonate ester, haloformate or the like. Specific examples of the carbonate precursor include phosgene, diphenyl carbonates and dihaloformates of diphenols.

In one embodiment, the polycarbonate compound includes 2,2-bis-(4-hydroxyphenyl)-propane polycarbonate compound, which is a linear polycarbonate compound. In another embodiment, a branched polycarbonate compound can be obtained by reacting a polyfunctional aromatic compound such as trimelitic anhydride and trimelitic acid with dihydric phenol and a carbonate precursor. In another embodiment, another polycarbonate compound can be obtained by reacting a difunctional carboxylic acid with dihydric phenol and a carbonate precursor.

Liquid Crystalline Polymer Resin

The liquid crystalline polymer resin used in embodiments of the invention includes an aromatic polyester compound, an aromatic polyester amide compound or a mixture of a liquid crystalline polymer compounds. These resins may generally be referred to as thermotropic as they change their phases over temperature. Without wishing to be bound to any particular theory, the liquid crystalline polymer may be understood to refer to what is mixed in the composition as it existed both before, during, and after forming the polycarbonate composition and after forming a molded article according to embodiments of the invention.

In some embodiments, the aromatic polyester resin has at least one repeating unit selected from the group consisting of Chemical Formula 1 ("repeating unit 1"), Chemical Formula 2 ("repeating unit 2") and Chemical Formula 3 ("repeating unit 3").

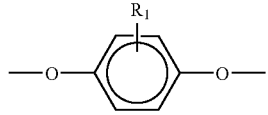

[Chemical Formula 1]

In the foregoing formula, $R_1$ is methyl, ethyl, a halogen.

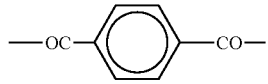

[Chemical Formula 2]

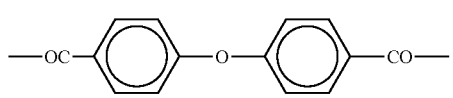

[Chemical Formula 3]

In one embodiment, the aromatic polyester compound includes repeating units 1, 2 and 3. More specifically, in the aromatic polyester compound of an embodiment, the mole ratio of the repeating unit 1 to the sum of the repeating units 2 and 3 is about 50 mol %. In another embodiment, the liquid crystalline polymer resin includes only repeating units 2 and 3. In the foregoing embodiment with the repeating units 2 and 3, more specifically, the mole ratio of the repeating unit 2 to the sum of the repeating units 2 and 3 is 0 to about 70 mol %, and the mole ratio of the repeating unit 3 to the sum is about 30 to 100 mol %.

In some embodiment, the liquid crystalline polymer compound comprises an aromatic polyester amide compound, which includes Chemical Formula 4 ("repeating unit 4"). In addition to the repeating unit 4, in certain embodiments, the aromatic polyester amide compound may further include at least one of Chemical Formula 1, 2 and 3.

[Chemical Formula 4]

In the foregoing formula, A is NH. In the aromatic polyester amide compound, the repeating unit 4 is from about 5% to 100 mol %. In one embodiment, the aromatic polyester amide compound includes repeating units 1, 2, 3 and 4.

In certain embodiments, in addition to or in the alternative to the repeating unit 4, the liquid crystalline polymer compound includes one or more of the repeating units: Chemical Formula 5 ("repeating unit 5"), Chemical Formula 6 ("repeating unit 6"), Chemical Formula 7 ("repeating unit 7") and Chemical Formula 8 ("repeating unit 8").

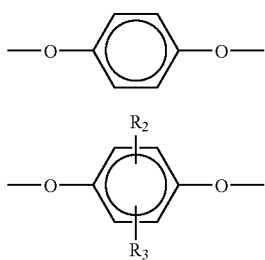

[Chemical Formula 5]

[Chemical Formula 6]

In Chemical Formula 6, $R_2$ and $R_3$ are independently methyl, ethyl or a halogen.

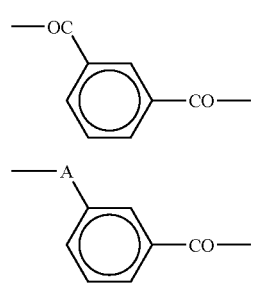

[Chemical Formula 7]

[Chemical Formula 8]

In Chemical Formula 8, A is O or NH.

Further, in some embodiment, the aromatic polyester compound containing at least one of the repeating units 1, 2, 3 may further include at least one of Chemical Formula 9 ("repeating unit 9") and Chemical Formula 10 ("repeating unit 10").

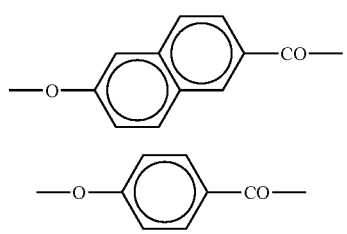

[Chemical Formula 9]

[Chemical Formula 10]

In some of the immediately foregoing embodiments, the liquid crystalline polymer compound may further include a repeating unit of Chemical Formula 11 ("repeating unit 11"). In one of these embodiments, the aromatic liquid crystalline polymer compound contains the repeating units 2, 9 and 11. In one embodiment of this liquid crystalline polymer compound, the repeating unit 9 has a molar ratio of about 10 to about 90 mol %. In another embodiment of this liquid crystalline polymer compound, the repeating unit 2 has a molar ratio of about 5 to about 45 mol %. In still another embodiment of this liquid crystalline polymer compound, the repeating unit 11 has a molar ratio of about 5 to about 45 mol %.

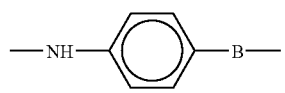

[Chemical Formula 11]

In Chemical Formula 11, B is O or NH.

Core-Shell Graft Copolymer

The core-shell graft copolymer used in embodiments of the invention is a copolymer comprised of a core polymer and a plurality of polymers grafted from the core polymer. In some embodiment, the core polymer includes a rubber. In embodiments, the core is in an amount of about 30 to about 90 parts by weight with reference to the total weight of the core-shell graft copolymer.

In embodiments, the polymers grafted onto the core is formed by grafting with one or more monomers selected from the group consisting of styrene, α-methylstyrene, halogen- or alkyl-substituted styrene, acrylonitrile, methacrylonitrile, $C_1$-$C_8$ methacrylic acid alkyl esters, $C_1$-$C_8$ acrylic acid alkyl esters, maleic acid anhydrides, $C_1$-$C_4$ alkyl and phenyl nuclear-substituted maleimide. The $C_1$-$C_8$ methacrylic acid alkyl esters and $C_1$-$C_8$ acrylic acid alkyl esters may be monohydryl alcohols of $C_1$-$C_8$ as esters of methacrylic acid and acrylic acid, respectively. In certain embodiments, the esters are methacrylic acid methyl ester, methacrylic acid ethyl ester and methacrylic acid propyl ester.

The rubber is polymerized with at least one of diene rubber monomer, acrylate rubber monomer and silicone rubber monomer. For example, the diene rubbers are butadiene rubber, acryl rubber, ethylene/propylene rubber, styrene/butadiene rubber, acrylonitrile/butadiene rubber, isoprene rubber, copolymer of ethylene-propylene-diene (EPDM), and so forth. For example, the acrylate rubber monomers are methyl acrylate, ethyl acrylate, n-propyl acrylate, n-butyl acrylate, 2-ethylhexyl acrylate, hexyl methacrylate, 2-ethylhexyl methacrylate, and so forth. In certain embodiment, a hardening agent may be used. Examples of the hardening agents include ethylene glycol dimethacrylate, propylene glycol dimethacrylate, 1,3-buylene glycol dimethacrylate, 1,4-buylene glycol dimethacrylate, allyl methacrylate, and triallyl cyanurate, and so forth.

Further, the silicone rubber monomers may be prepared from cyclosiloxane, and the examples of the silicone rubber monomers are hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyltetraphenyl cyclotetrasiloxane, octaphenyl cyclotetrasiloxane, etc. In certain embodiment, a hardening agent may be used for preparation of the silicone rubber. The examples of the hardening agent are trimethoxymethylsilane, triethoxyphenylsilane, tetramethoxysilane, tetraethoxysilane, etc.

Low-Molecular Weight Polyolefin

The polyolefin resin used in embodiments of the invention includes one or more polymer compounds polymerized from olefin monomers. The polyolefin resin may include a homopolymer or a copolymer. Olefins or olefin monomers, also called alkenes, are unsaturated hydrocarbons whose molecules contain one or more pairs of carbon atoms linked together by a double bond. Examples of polyolefin resin are polyethylene, polypropylene, polyisopropylene, polybutylene, polyisobutylene, etc.

In embodiments, the low molecular weight polyolefin resin has a number average molecular weight from about 300 to about 30,000 g/mol, which includes, for example, 300, 400, 500, 600, 700, 800, 900, 1,000, 1,200, 1,400, 1,500, 2,000, 3,000, 4,000, 5,000, 6,000, 7,000, 8,000, 9,000, 10,000, 15,000, 20,000, 25,000, 30,000, 35,000, 40,000 g/mol. In certain embodiments, the low molecular weight polyolefin has a number average molecular weight ranged between two of the foregoing values. In one embodiment, the low molecular weight polyolefin has a number average molecular weight from about 1,000 to about 20,000 g/mol.

In one embodiment, the low molecular weight polyolefin resin can be produced by decomposing a high molecular weight polyolefin compounds. In another embodiment, the low molecular weight polyolefin resin can be produced with a controlled polymerization reaction of one or more olefin monomers by controlling time, temperature or the kind and an amount of catalysts. One of ordinary skill in the art will appreciate the production of a low molecular weight polyolefin resin used in the embodiments of the invention. For example, the low molecular weight polyolefin used in the embodiments of the invention may be prepared using a Ziegler-Natta catalyst or a metallocene-containing catalyst. The low molecular weight polyolefin may be prepared by thermal or chemical degradation of high molecular weight polyolefin such as high density polyethylene(HDPE), low density polyethylene(LDPE), polypropylene and so on.

In certain embodiments, the low molecular weight polyolefin may be modified by grafting one or more monomers with a functional group such as maleic anhydride on to the main chain of low molecular weight polyolefin. In other embodiments, the low molecular weight polyolefin may be modified by grafting a polymer such as polystyrene as a branch onto the low molecular weight polyolefin backbone.

The features of the invention may be further described with reference to the following examples. These examples are intended for the purpose of illustration and are not to be construed as in any way limiting the scope of the present invention.

EXAMPLES

In the following examples, as for the polycarbonate resin, a linear polycarbonate resin of 2,2-bis-(4-hydroxyphenyl)-propane polycarbonate, "PANLITE L-1250 WP" available from TEIJIN, with an average molecular weight ($M_w$) of about 25,000 g/mol was used. As for the liquid crystalline polymer resin, a liquid crystalline polymer resin, "UENO LCP A5000" available from UENO Co. with a melting point of 280° C., a specific gravity of 1.40, was used. As for a core-shell grafted copolymer, butadiene core with grafted methacrylic acid methyl ester monomers, "C-223A" available from MRC Co. was used. As for the low molecular weight polyolefin, polyethylene having a number average molecular weight of 4,000 g/mol was prepared by thermal degradation of high molecular weight polyolefin.

These components were mixed in a conventional mixer and the mixture was extruded through a twin screw extruder with a bore diameter of 45 mm to prepare a mold in pellet form. The resin pellets were dried at 110° C. over 3 hours and molded into test specimens (Examples 1 and 2) using a 10 oz injection molding machine at injection temperature of 280-320° C. and at mold temperature of 60-90° C. The specimens for Examples 3-6 were prepared in the same manner as in Examples 1 and 2. The component compositions are listed in Table 1 as parts by weight.

TABLE 1

|  | Examples | | Examples | | | |
|---|---|---|---|---|---|---|
|  | 1 | 2 | 3 | 4 | 5 | 6 |
| Polycarbonate Resin | 93 | 88 | 100 | 97 | 96 | 94 |
| Liquid Crystalline Polymer | 3 | 5 | — | — | — | 3 |
| Core-Shell Grafted Copolymer | 3 | 5 | — | 3 | 3 | 3 |
| Low Molecular Weight Polyolefin | 1 | 2 | — | — | 1 | — |

Chemical Treatment

Specimens of Examples 1-6 were tested using the test methodologies as discussed below without a chemical treatment. Additional specimens of Example 1-6 were tested using the same test methodologies but after a chemical treatment. The chemical treatment involved submerging the specimens in thinner (product name: "Thinner 276" available from Daihan Bee Chemical Co.) for 20 sec. Then, the chemically treated specimen was dried at 70° C. for 5 minutes.

Impact Strength

Impact strength refers to mechanical strength of a sample relating to resistance to certain impacts thereto. The specimens were prepared and tested according to the standard, ASTM D256 (⅛" notched) at temperature of 23° C. and relative humidity of 50%. The impact strength was measured in the unit "kg·cm/cm."

Fatigue Resistance

Fatigue resistance refers to a mechanical property of a sample relating to resistance to repeated application of force onto the sample. The fatigue resistance of the specimens was tested according to the standard, ASTM D638 while repeatedly applying pressure 4000 psi at 5 times per second onto the test specimens along the longitudinal direction until the fatigue destruction occurs. The number is the number of impacts that the sample withstood before fatigue destruction occurred.

Impact Resistance

Impact resistance also refers to mechanical strength of a sample relating to resistance to certain impacts thereto. The specimens for the impact resistance test were prepared according to the standard ASTM D256 and a hemispheric notch having a radius of 0.25±0.05 mm is formed in each specimen. Then, the impact resistance of the specimens was tested in accordance with the standard ASTM D3029, which was carried out by dropping a weight of 2 kg to the specimens at different heights of 600, 800 and 1,000 mm on the rear side of the notch. Each specimen was tested 20 times. The test may evaluate ductile fracture and brittle fracture of the specimens. The ductile fracture refers to the state that test specimen is not cracked but sunken in by impact. On the other hand, brittle fracture refers to the state that the specimen is cracked. Brittle fracture (%) was determined by calculating a percent of occurring brittle fracture in the test specimens.

TABLE 2

|  |  |  | Examples | | | | | |
|---|---|---|---|---|---|---|---|---|
|  |  |  | 1 | 2 | 3 | 4 | 5 | 6 |
| Before chemical treatment | Impact Strength | | 71 | 71 | 73 | 65 | 65 | 68 |
|  | Fatigue Resistance | | 223,000 | 257,000 | 101,000 | 91,000 | 90,000 | 204,000 |
|  | Impact Resistance (Brittle Fracture %) | 600 mm | 0 | 0 | 50 | 0 | 0 | 0 |
|  |  | 800 mm | 0 | 0 | 80 | 10 | 0 | 10 |
|  |  | 1,000 mm | 0 | 0 | 100 | 30 | 0 | 20 |

TABLE 2-continued

|  |  |  | Examples | | | | | |
| --- | --- | --- | --- | --- | --- | --- | --- | --- |
|  |  |  | 1 | 2 | 3 | 4 | 5 | 6 |
| After chemical treatment | Impact Strength |  | 70 | 70 | 65 | 63 | 64 | 65 |
|  | Fatigue Resistance |  | 182,000 | 198,000 | 68,000 | 60,000 | 61,000 | 115,000 |
|  | Impact Resistance (Brittle Fracture %) | 600 mm | 0 | 0 | 100 | 100 | 70 | 10 |
|  |  | 800 mm | 0 | 0 | 100 | 100 | 90 | 40 |
|  |  | 1,000 mm | 0 | 0 | 100 | 100 | 100 | 60 |

As shown in Table 2, Examples 1 and 2 containing a polycarbonate resin, a liquid crystalline polymer resin, a core-shell grafted copolymer and a low molecular weight polyolefin exhibited enhanced impact strength, fatigue resistance, and impact resistance, both before and after chemical treatment. Prior to chemical treatment, Example 1 and 2 had superior impact strength relative to Examples 4-6. Example 3 exhibited similar impact strength as Example 1 and 2 before chemical treatment, but had inferior impact and fatigue resistance.

Additional Examples

The following table lists additional examples of the polycarbonate compositions according to embodiments of the invention. The specimens of Examples 7-14 were tested for the impact strength, fatigue resistance and impact resistance as described above before and after the same chemical treatment.

TABLE 3

|  | Examples | | | | | | | | |
| --- | --- | --- | --- | --- | --- | --- | --- | --- | --- |
|  | 7 | 8 | 9 | 10 | 11 | 12 | 13 | 14 | 15 |
| Polycarbonate Resin | 99 | 97 | 94 | 93 | 90 | 87 | 83 | 80 | 75 |
| Liquid Crystalline Polymer | 0.3 | 0.5 | 2 | 2 | 4 | 4 | 6 | 7 | 10 |
| Core-Shell Grafted Copolymer | 0.5 | 2 | 3 | 4 | 5 | 7 | 9 | 10 | 11 |
| Low Molecular Weight Polyolefin | 0.2 | 0.5 | 1 | 1 | 1 | 2 | 2 | 3 | 4 |

Each of Examples 7-15 has an impact strength of at least 68 kg·cm/cm after chemical treatment. Each of Examples 7-15 has an impact resistance of exhibiting substantially no cracking after chemical treatment at 0.6 m, 0.8 m and 1 m testing. Each of Examples 7-15 has a fatigue resistance of at least about 130,000 before or after chemical treatment.

The skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein.

What is claimed is:

1. A polycarbonate composition comprising:
   80 to 98 parts by weight of a polycarbonate resin;
   0.3 to 10 parts by weight of a liquid crystalline polymer resin;
   0.5 to 10 parts by weight of a core-shell grafted copolymer; and
   0.1 to 4 parts by weight of a polyolefin having a number average molecular weight of from about 1,000 g/mol to less than 10,000 g/mol.

2. The composition of claim 1, wherein the composition has an impact strength of at least about 68 kg·cm/cm when a specimen of the composition is subject to a chemical treatment and the chemically treated specimen is tested according to the standard ASTM D256 (1/8" notched) at 23° C., and wherein the chemical treatment comprises submerging the specimen in paint thinner for 20 seconds and thereafter drying the specimen at 70° C. for 5 minutes.

3. The composition of claim 1, wherein the composition has an impact resistance of exhibiting substantially no cracking when a specimen of the composition is subject to a chemical treatment and the chemically treated specimen is tested at 0.6 m according to the standard ASTM D3029, wherein the specimen is prepared according to the standard ASTM D256 with a hemispheric notch having a radius of 0.25±0.05 mm, and wherein the chemical treatment comprises submerging the specimen in paint thinner for 20 seconds and thereafter drying the specimen at 70° C. for 5 minutes.

4. The composition of claim 1, wherein the composition has a fatigue resistance of at least about 130,000 when a specimen of the composition is tested at 4000 psi at 5 times per second according to the standard ASTM D638.

5. A molded article comprising the composition of claim 1.

6. The molded article of claim 5, comprising a pellet of the composition or a structure for use as a body or housing of an electronic device.

7. The composition of claim 2, wherein the composition has an impact strength of at least 70 kg·cm/cm when the chemically treated specimen is tested according to the standard ASTM D256 (1/8" notched).

8. The composition of claim 2, wherein the composition is in the form of a molded article.

9. The composition of claim 8, wherein the molded article comprises a surface, and wherein the surface is coated with a coating layer comprising an oil-based coating material.

10. A method of making an electronic device, comprising:
    providing the molded article coated with the coating layer according to claim 9;
    providing at least one electrical part of an electronic device; and
    connecting the molded article with the at least one electrical part.

11. An electronic device produced by the method of claim 10.

12. An electronic device comprising:
a molded article comprising 80 to 98 parts by weight of a polycarbonate resin, 0.3 to 10 parts by weight of a liquid crystalline polymer resin, 0.5 to 10 parts by weight of a core-shell grafted copolymer and 0.1 to 4 parts by weight of a low molecular weight polyolefin having a number average molecular weight of from about 1,000 g/mol to less than 10,000 g/mol, wherein the molded article further comprising a surface; and
a coating layer formed on the surface of the molded article, the coating layer comprising a residual amount of an organic solvent;
wherein the molded article coated with the coating layer has an impact strength of at least about 68 kg·cm/cm when a specimen of the composition is tested according to the standard ASTM D256 (⅛" notched).

13. The composition of claim 3, wherein the composition has an impact resistance of exhibiting substantially no cracking when the chemically treated specimen is tested at 0.8 m according to the standard ASTM D3029.

14. The composition of claim 3, wherein the composition has an impact resistance of exhibiting substantially no cracking when the chemically treated specimen is tested at 1 m according to the standard ASTM D3029.

15. The composition of claim 3, wherein the composition is in the form of a molded article.

16. The composition of claim 15, wherein the molded article comprises a surface, and wherein the surface is coated with a coating layer comprising an oil-based coating material.

17. A method of making an electronic device, comprising:
providing the molded article coated with the coating layer according to claim 16;
providing at least one electrical part of an electronic device; and
connecting the molded article with the at least one electrical part.

18. An electronic device produced by the method of claim 17.

19. An electronic device comprising:
a molded article comprising 80 to 98 parts by weight of a polycarbonate resin, 0.3 to 10 parts by weight of a liquid crystalline polymer resin, 0.5 to 10 parts by weight of a core-shell grafted copolymer and 0.1 to 4 parts by weight of a low molecular weight polyolefin having a number average molecular weight of from about 1,000 g/mol to less than 10,000 g/mol, wherein the molded article further comprising a surface; and
a coating layer formed on the surface of the molded article, the coating layer comprising a residual amount of an organic solvent;
wherein the molded article has an impact resistance of exhibiting substantially no cracking when a specimen of the molded article is tested at 0.6 m according to the standard ASTM D3029, and wherein the specimen is prepared according to the standard ASTM D256 with a hemispheric notch having a radius of 0.25±0.05 mm.

20. The composition of claim 4, wherein the composition has a fatigue resistance of at least about 130,000 when the specimen is subject to a chemical treatment and the chemically treated specimen is tested at 4000 psi at 5 times per second according to the standard ASTM D638, and wherein the chemical treatment comprises submerging the specimen in paint thinner for 20 seconds and thereafter drying the specimen at 70° C. for 5 minutes.

21. The composition of claim 4, wherein the composition has a fatigue resistance of at least about 150,000 when the specimen is subject to a chemical treatment and the chemically treated specimen is tested at 4000 psi at 5 times per second according to the standard ASTM D638, and wherein the chemical treatment comprises submerging the specimen in paint thinner for 20 seconds and thereafter drying the specimen at 70° C. for 5 minutes.

22. The composition of claim 4, wherein the composition has a fatigue resistance of at least about 170,000 when the specimen is tested at 4000 psi at 5 times per second according to the standard ASTM D638 without a chemical treatment prior to testing.

23. The composition of claim 4, wherein the composition is in the form of a molded article.

24. The composition of claim 23, wherein the molded article comprises a surface, and wherein the surface is coated with a coating layer comprising an oil-based coating material.

25. A method of making an electronic device, comprising:
providing the composition of claim 23 in the form of the molded article coated with the coating layer on the surface;
providing at least one electrical part of an electronic device; and
connecting the molded article with the at least one electrical part.

26. An electronic device produced by the method of claim 25.

27. An electronic device comprising:
a molded article comprising 80 to 98 parts by weight of a polycarbonate resin, 0.3 to 10 parts by weight of a liquid crystalline polymer resin, 0.5 to 10 parts by weight of a core-shell grafted copolymer and 0.1 to 4 parts by weight of a low molecular weight polyolefin having a number average molecular weight of from about 1,000 g/mol to less than 10,000 g/mol, wherein the molded article further comprising a surface; and
a coating layer formed on the surface of the molded article, the coating layer comprising a residual amount of an organic solvent;
wherein the molded article has a fatigue resistance of at least about 130,000 when a specimen of the molded article is tested at 4000 psi at 5 times per second according to the standard ASTM D638.

28. The composition of claim 1, wherein:
said polycarbonate resin comprises a 2,2-bis(4-hydroxyphenyl)propane polycarbonate compound;
said liquid crystalline polymer comprises a polymer including a unit of Formula 11

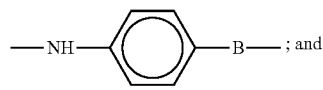

said core-shell grafted copolymer comprises a butadiene rubber core and a shell polymer derived from a $C_1$-$C_8$ methacrylic acid alkyl ester.

29. A molded article comprising the composition of claim 28.

30. The composition of claim 2, wherein:
said polycarbonate resin comprises a 2,2-bis(4-hydroxyphenyl)propane polycarbonate compound;
said liquid crystalline polymer comprises a polymer including a unit of Formula 11

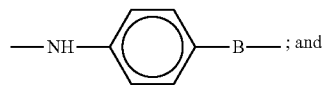

said core-shell grafted copolymer comprises a butadiene rubber core and a shell polymer derived from a $C_1$-$C_8$ methacrylic acid alkyl ester.

31. The electronic device of claim 12, wherein:
said polycarbonate resin comprises a 2,2-bis(4-hydroxyphenyl)propane polycarbonate compound;
said liquid crystalline polymer comprises a polymer including a unit of Formula 11

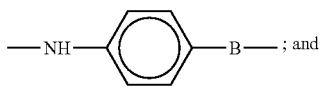

said core-shell grafted copolymer comprises a butadiene rubber core and a shell polymer derived from a $C_1$-$C_8$ methacrylic acid alkyl ester.

32. The composition of claim 13, wherein:
said polycarbonate resin comprises a 2,2-bis(4-hydroxyphenyl)propane polycarbonate compound;
said liquid crystalline polymer comprises a polymer including a unit of Formula 11

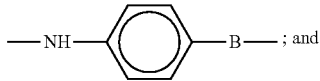

said core-shell grafted copolymer comprises a butadiene rubber core and a shell polymer derived from a $C_1$-$C_8$ methacrylic acid alkyl ester.

33. The electronic device of claim 19, wherein:
said polycarbonate resin comprises a 2,2-bis(4-hydroxyphenyl)propane polycarbonate compound;
said liquid crystalline polymer comprises a polymer including a unit of Formula 11

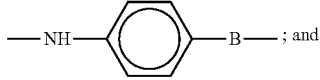

said core-shell grafted copolymer comprises a butadiene rubber core and a shell polymer derived from a $C_1$-$C_8$ methacrylic acid alkyl ester.

34. The composition of claim 20, wherein:
said polycarbonate resin comprises a 2,2-bis(4-hydroxyphenyl)propane polycarbonate compound;
said liquid crystalline polymer comprises a polymer including a unit of Formula 11

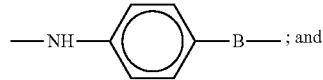

said core-shell grafted copolymer comprises a butadiene rubber core and a shell polymer derived from a $C_1$-$C_8$ methacrylic acid alkyl ester.

35. The electronic device of claim 27, wherein:
said polycarbonate resin comprises a 2,2-bis(4-hydroxyphenyl)propane polycarbonate compound;
said liquid crystalline polymer comprises a polymer including a unit of Formula 11

said core-shell grafted copolymer comprises a butadiene rubber core and a shell polymer derived from a $C_1$-$C_8$ methacrylic acid alkyl ester.

36. The composition of claim 1, wherein said polyolefin has a number average molecular weight of 9,000 g/mol or less.

37. The composition of claim 36, wherein said polyolefin has a number average molecular weight of 4,000 g/mol or less.

38. The molded article of claim 5, wherein said polyolefin has a number average molecular weight of 9,000 g/mol or less.

39. The molded article of claim 38, wherein said polyolefin has a number average molecular weight of 4,000 g/mol or less.

* * * * *